Dec. 22, 1964 L. F. BRIGGS 3,162,417
SMOKE RACK AND TREES
Filed Nov. 8, 1963 2 Sheets-Sheet 1
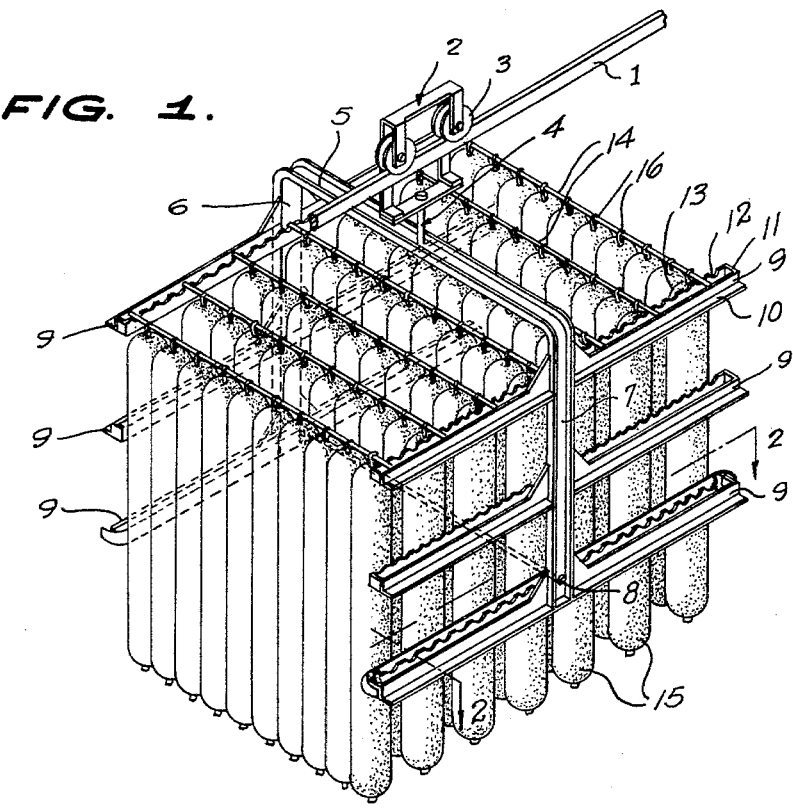
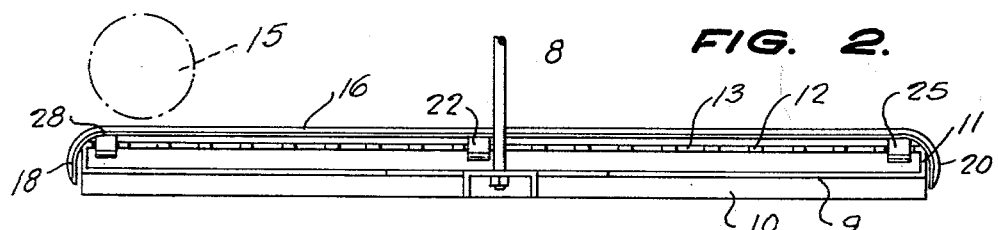
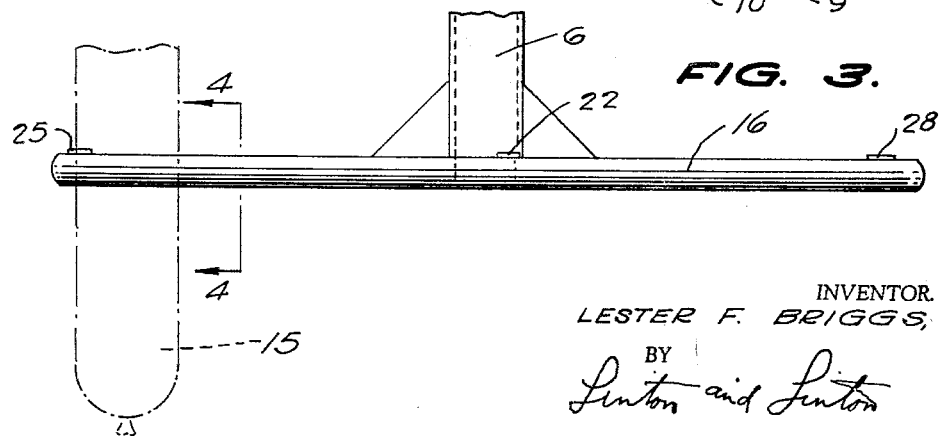
INVENTOR.
LESTER F. BRIGGS,
BY
Linton and Linton
ATTORNEYS.

Dec. 22, 1964   L. F. BRIGGS   3,162,417
SMOKE RACK AND TREES
Filed Nov. 8, 1963   2 Sheets-Sheet 2
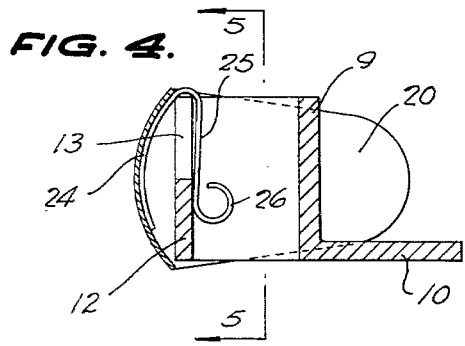
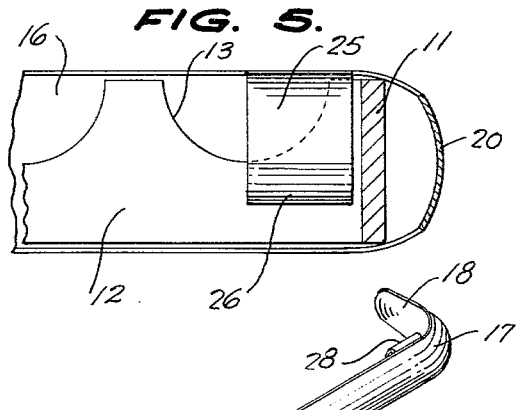
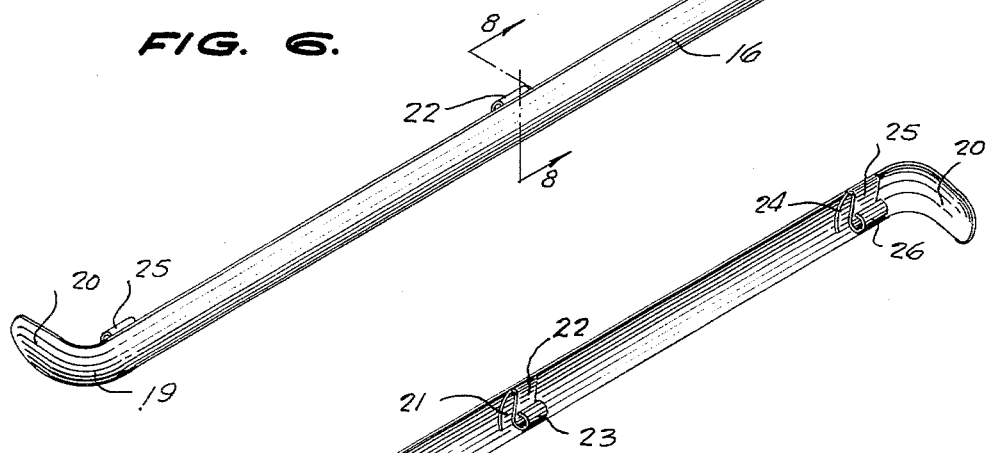
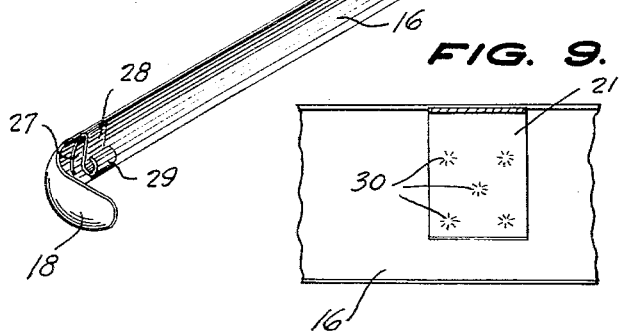
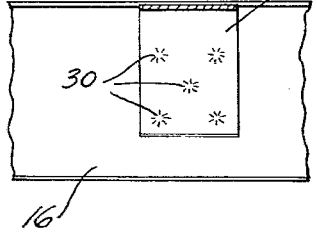
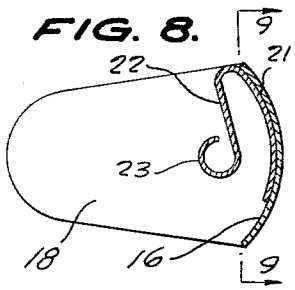
INVENTOR.
LESTER F. BRIGGS,
BY
Linton and Linton
ATTORNEYS.

United States Patent Office 3,162,417
Patented Dec. 22, 1964

3,162,417
SMOKE RACK AND TREES
Lester F. Briggs, 6601 Columbia Park Road,
Landover, Md.
Filed Nov. 8, 1963, Ser. No. 322,479
2 Claims. (Cl. 248—345.1)

The present invention relates to conveyors upon which food products are hung and is more particulraly concerned with an improvement in smoke racks or trees.

The principal object of the present invention is to provide conveyors known in the trade as smoke racks or trees with detachable protectors for the meat products being carried whereby the meat products will not be damaged by engagement with elements of the conveyor during their association with the conveyor.

A further and important object of the invention is to provide an economically producible and long lasting protector for use on smoke trees and racks which protector can be quickly and easily mounted on or detached from its associated smoke tree or rack without the use of tools and can be quickly cleaned to the point of being sterilized, will not be affected by its surrounding atmosphere either in or out of a smoke house or contact with the ingredients of the meat products so that it will not become stained or rusted.

Further objects of the invention will be in part obvious and in part pointed out in the following description of the accompanying drawings, in which:

FIG. 1 is a perspective view of an example of a conveyor incorporating the present invention.

FIG. 2 is an enlarged cross-sectional view taken on line 2—2 of FIG. 1.

FIG. 3 is a side view of a mounted protector taken from the top of FIG. 2.

FIG. 4 is a further enlarged cross-sectional view taken on line 4—4 of FIG. 3.

FIG. 5 is a further enlarged cross-sectional view taken on line 5—5 of FIG. 4.

FIG. 6 is an enlarged perspective front view of the present protector.

FIG. 7 is an enlarged perspective rear view of the protector.

FIG. 8 is a further enlarged cross-sectional view taken on line 8—8 of FIG. 6; and FIG. 9 is also a further enlarged cross-sectional view, but taken on line 9—9 of FIG. 8.

Conveyors for food products particularly those of an elongated configuration such as sausages or the like, as known are in many forms such as wheeled racks or smoke trees suspended from an overhead monorail and the latter include types which may be nested or folded when not in use. Such conveyors are used for conveying the products from one area to another as for example from a processing room to a smoke chamber or elsewhere and are well known. The present invention is used in combination with any of the known conveyors for this purpose and in order that it may be understood there is disclosed in the accompanying drawing a conventional nestable smoke tree suspended from an overhead mono-rail solely as an example of one way in which the invention can be employed and it is to be understood that the invention is not restricted thereto.

That is, as best known in FIG. 1, the conveyor may include a mono-rail 1 suspended from an over-head support (not shown) with a trolley hanger generally indicated by the reference numeral 2 having wheels 3 running on said mono-rail and a hanger bolt 4 suspended vertically therebeneath. An inverted U-shaped frame including a top 5 connected to and supported by bolt 4 and spaced parallel, vertical sides 6 and 7 joined at their ends by a connector rod 8, supports a plurality of similar cross-members 9. Each of said sides is shown having three of said cross-members connected at their middle portion thereto and extending normal therefrom.

Each of said cross-members 9 has a laterally extending flange 10 along their length, a pair of end walls 11 each at an opposite end of said cross-member extending laterally therefrom on a side opposite flange 10 and joined by a supporting wall 12 normal to said end walls. Each wall 12 has a series of semi-circular recesses provided in and along the top edge of said wall 12 for receiving an end of a smoke stick 14 therein.

Said conveyor elements are of a metallic material and recesses 13 as a result of their configuration and the forming thereof provide a number of sharp edges along said supporting walls such as the point of their meeting with the top edge of the wall as well as the side of said top edge.

Sausages 15, shown by way of an example only of a meat product to be conveyed, have rings 16 of string or the like attached to the skins of the sausage and each series of said sausages has a smoke stick 14 extending through said rings with said stick positioned in a recess 13 of opposite walls 12 with the sausage hanging downwardly. The cross-members selected for receiving the smoke sticks depends upon the length of the sausage and in the present example the top cross-members 9 are used leaving the lower cross-members unused. As the conveyor is moved along mono-rail 1 or when the sausages are being mounted on or taken off the conveyor they tend to strike the lower walls 12 and those sausages engaging said walls 12 are damaged by the sharp edges of said walls to the extent that the sausage content is bruised or the skin thereof torn exposing the sausage content or permitting the same to escape from the skin rendering the sausage unsuitable for being marketed.

To prevent the sausage from being damaged, a detachable protector 16 is mounted upon the unused walls 12 facing the sausage. Said protector includes an elongated strip of a concave-convex cross-sectional configuration and may be of wood, plastic or metal, but is preferably of stainless steel, with curved portions 17 and 19 providing laterally extending end portions 18 and 20 respectively and resilient clips 21, 24 and 27. Clip 21 is fastened to the concave or rear side of said protector by conventional means such as spot welds 30 as shown in FIG. 9 and has a reverse portion 22 ending in a curled end portion 23. Similarly clip 24 has a reverse portion 25 and curled end portion 26 while clip 27 has reverse portion 28 and curled end portion 29. Clip 21 is fastened to a medial portion of said protector while clips 24 and 27 are fastened thereto adjacent curved portions 17 and 19, but may equally as well be at different positions along said protector.

In use each protector 16 is mounted on a wall 12 by inserting the wall between the clips 21, 24 and 27 and their reverse portions 22, 25 and 28 respectively with the protector being of sufficient length to extend along its joined wall 12 and around the end walls 11 thereof separating the sausage 15 from contact with said walls 11 and 12 and possible damage thereby.

Said protectors 16 can be raised from their wall 12 releasing said clips and cleansed, stored or replaced on a wall 12 of the same or other smoke trees or racks as desired.

The present device is capable of considerable modification and such changes thereto as come within the scope of the appended claims is deemed a part of the invention.

I claim:

1. A protector for use on smoke stick supporting members of smoke trees and racks comprising an elongated member having a concave-convex cross-sectional configuration, a plurality of clips of resilient material each having a V-shaped cross-sectional configuration with one side affixed to the concave side of said elongated member and said clips being similarly positioned and spaced apart along the length of said elongated member with the sides thereof extending laterally of said elongated member for receiving the smoke stick supporting member between said side detachably supporting said elongated member along the length of the smoke stick supporting member.

2. A protector for use on smoke stick supporting members of smoke trees and racks comprising an elongated member having a straight medial portion and curved end portions extending laterally of said medial portion and in the same direction therefrom, said elongated member having a concave-convex cross-sectional configuration, a plurality of clips affixed to the concave side of said elongated member and spaced apart along said medial portion thereof and said elongated member medial portion being at least as long as the smoke stick supporting member whereby said clips can detachably support said elongated member lengthwise of the smoke stick supporting member for preventing food products supported by the smoke sticks from abutting the smoke stick supporting member.

References Cited by the Examiner

UNITED STATES PATENTS

| | | | |
|---|---|---|---|
| 1,284,854 | 11/18 | Benn | 17—44.2 |
| 2,166,798 | 7/39 | Cote | 45—137.2 X |
| 2,410,648 | 11/46 | Friegel | 211—153 |
| 2,477,413 | 7/49 | Mayer | 17—44.4 |
| 2,574,319 | 11/51 | Cadwallader | 211—118 |
| 2,685,473 | 8/54 | Adell | 16—1 |

FOREIGN PATENTS 504,314  4/39  Great Britain.

CLAUDE A. LE ROY, *Primary Examiner.*